J. M. DE LA ROSA.
ARITHMETICAL ABACUS.
APPLICATION FILED JULY 10, 1912.
1,081,815.
Patented Dec. 16, 1913.
3 SHEETS—SHEET 2.
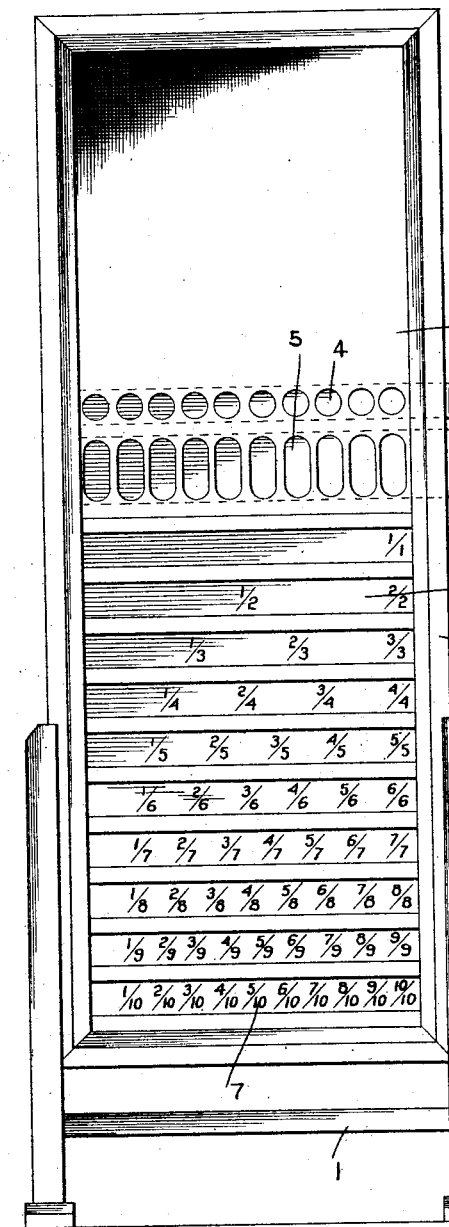
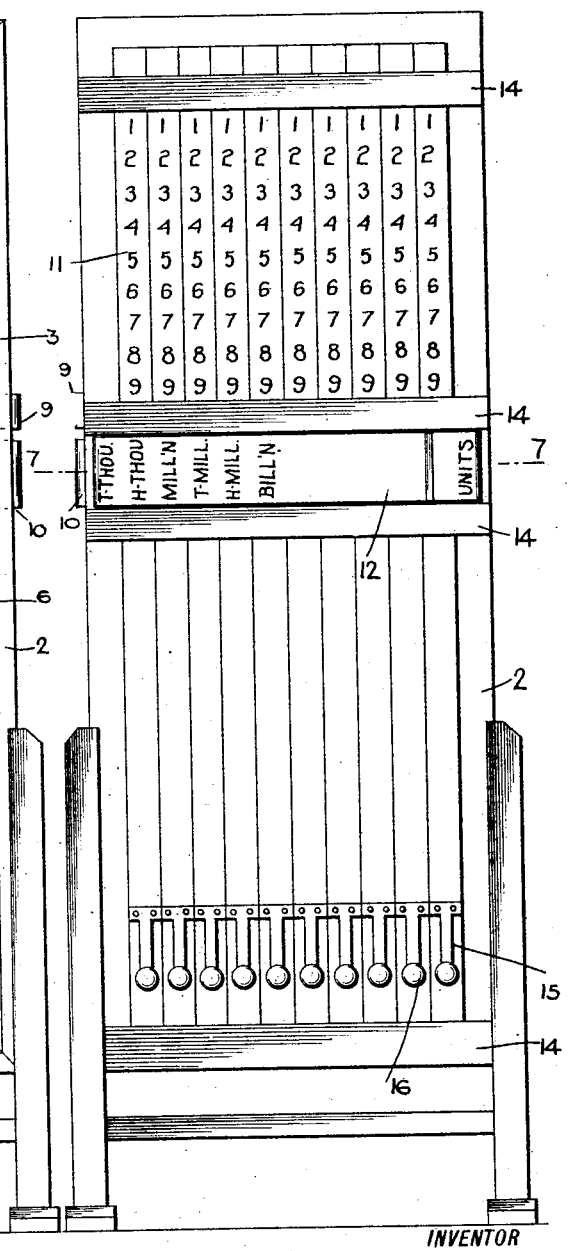
WITNESSES
INVENTOR
José Miguel de La Rosa
BY Munn & Co
ATTORNEYS J. M. DE LA ROSA.
ARITHMETICAL ABACUS.
APPLICATION FILED JULY 10, 1912.
1,081,815.
Patented Dec. 16, 1913.
3 SHEETS—SHEET 3.
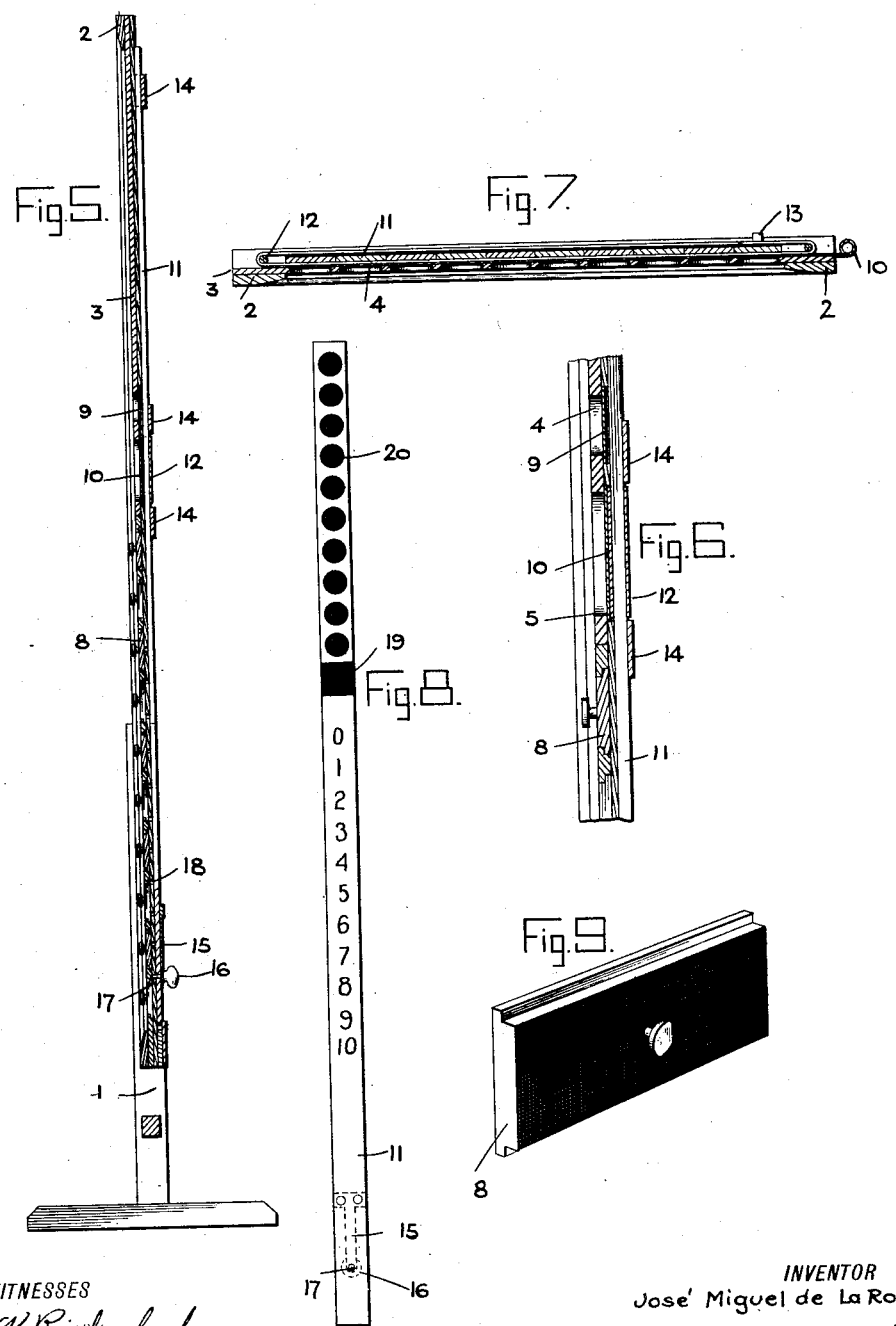
WITNESSES
INVENTOR
Jose' Miguel de La Rosa
BY Munn & Co
ATTORNEYS

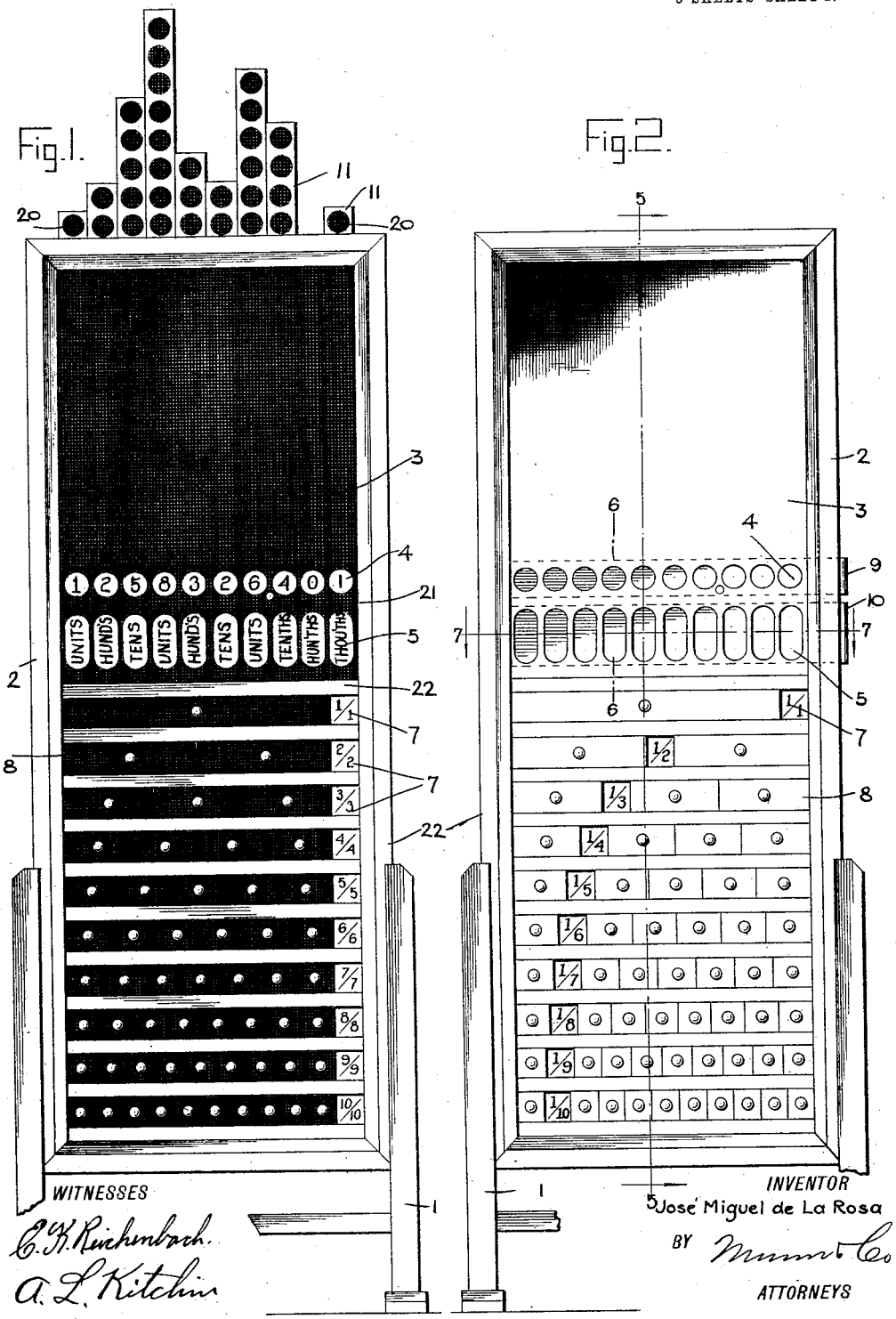

UNITED STATES PATENT OFFICE.

JOSÉ MIGUEL DE LA ROSA, OF AREQUIPA, PERU.

ARITHMETICAL ABACUS.

1,081,815.      Specification of Letters Patent.      Patented Dec. 16, 1913.

Application filed July 10, 1912. Serial No. 708,689.

*To all whom it may concern:*

Be it known that I, JOSÉ MIGUEL DE LA ROSA, a citizen of the Republic of Peru, and a resident of Arequipa, Peru, have invented a new and Improved Arithmetical Abacus, of which the following is a full, clear, and exact description.

This invention relates to an arithmetical abacus or device for use in instructing any one in the study of numerals, and has for an object to provide an improved arrangement of mechanical members on which numerals, fractions, and other information are placed, the entire arrangement being such as to present various information in any desired order.

More particularly the object in view is to teach a person, as for instance a child, to count, to perform mental addition and subtraction, to teach the use of figures or numerals and the value thereof, and to explain in detail the formation of the nine fundamental numbers, teaching at once both their objective and graphic representations.

A still further object is to gradually teach the use of the numerals in various orders and their various values, both their absolute and relative values.

A still further object of the invention is to provide an improved structure which is adapted for use as means for teaching deaf mutes substantially in a similar manner to the way the ordinary scholar is taught.

In carrying out these objects and others, the invention comprises the provision of a suitable framework or support on which is arranged a mechanical device substantially defining a chart having adjustable members. This device is provided with an upper and lower portion together with vertically moving slides co-acting with the upper portion and with suitable apertures provided in the upper portion, whereby certain indications may be presented to the child or person being taught, at the point of the apertures and also at a point above the upper portion of the device. Arranged in the lower portion are a plurality of slides, back of which are positioned in proper order the fractions of the numerals one to ten, the slides being arranged to cover the various fractions which they represent so that when a given slide is moved from its original position the same will disclose the fraction of the whole number which it represents. The upper and lower portions may be used together or at different times as occasion may require for teaching or instructing a child in any particular problem desired.

A practical embodiment of the invention is represented in the accompanying drawings forming a part of this specification, in which similar characters of reference indicate corresponding parts in all the views.

Figure 1 is a front view of the device, part of the supporting frame being broken away; Fig. 2 is a view similar to Fig. 1, except that the vertical slides are shown in their lowered position and the horizontal slides are variously adjusted for disclosing certain fractions therebeneath; Fig. 3 is a view similar to Fig. 2, except that the horizontal slides are shown removed; Fig. 4 is a rear view of the entire device; Fig. 5 is a section through Fig. 2 on line 5—5; Fig. 6 is an enlarged fragmentary sectional view partially on the line 6—6 of Fig. 2; Fig. 7 is an enlarged sectional view through Fig. 2 on the line 7—7; Fig. 8 is an enlarged front view of one of the vertical slides; and Fig. 9 is an enlarged perspective view of one of the horizontal slides.

Referring to the accompanying drawings by numerals, 1 indicates a framework of any desired kind for supporting a suitable frame 2, on which is arranged a blackboard 3 provided with a plurality of apertures 4 and 5, apertures 4 preferably being round and apertures 5 preferably being oblong or substantially oblong. The board 3 is preferably made black so that the same may be used as an ordinary blackboard, but any desired color could of course be used without departing from the spirit of the invention. The board 3 extends downward to the bottom of the frame 2 and forms a fraction board 6 containing ways for receiving a plurality of numerals 7 formed in fractions, as clearly shown in Fig. 3, these numerals being preferably formed black on a white background so that the slides 8 which cover the same when made black will cause the fractions to be clearly seen as the slides are moved to one side (Fig 1). Suitable apertures are provided in the frame 2 for receiving slides 9 and 10 which normally cover the openings 4 and 5 so that the vertical slides 11 and the traveling belt 12 cannot be seen. The slide 10 normally covers the traveling belt 12 which is operated by a suitable projection 13 so that the designations thereon may be easily seen, as for instance the designations shown in Fig. 1. When the slide 9 is removed the numerals, as shown in Fig. 1, may be seen through aperture 4, the same being arranged on the respective slides 11 which are held in place on the back of the board by suitable cross pieces 14. Each of the slides 11 is provided with a spring 15 having a knob 16 connected therewith provided with a pin 17 designed to fit into any of the apertures 18 for holding the slides 11 in any adjusted position, the openings 18 being properly spaced apart for locking the slides so that some numerals will be opposite the openings 4 or the blank space 19 will be opposite the opening 4.

In use when it is desired to teach a child to count, one of the slides may be raised so that the numeral one will be disclosed in one of the openings 4, whereupon one of the spots 20 will be disclosed above the frame 2. The child is informed that the numeral one and the spot are equal so that when the slide is moved up until the numeral two appears the child can see that there are two black spots raised above the frame 2 so that the numeral two must represent or be equal to the two black spots. In this way the child may be taught the numbers, one to nine inclusive, and what they represent, that is, their value, each spot indicating a numeral. On the back of the slides 11 are arranged, rows of numbers corresponding to the spots on the front face so that when the numeral 1 on any particular slide (Fig. 4) is raised above the upper cross bar 14 one spot will be visible from the front. In this way the instructor may take his position in back of the device and know how many spots he is disclosing by an inspection of the numbers appearing above the upper cross bar 14.

After the child has learned to count, addition, subtraction, and other arithmetical problems may be taught by variously adjusting or changing the vertical slides. For instance, if it is desired to teach the child to add, one slide could be raised so that one spot will appear above the frame and then a second slide raised until two spots on the second slide appear above the frame, and the child be required to count those three spots. Upon counting the spots the result will be three so that the child will know that one added to two makes three. A third slide then may be raised with three spots disclosed and the numeral three appearing opposite one of the openings 4 so that the child can see that one added to two equal the numeral three or the three spots on the third slide.

Various other lessons may be taught, as for instance the child may be taught the relative value of numerals by using the expressions units and hundreds, etc., as shown in Fig. 1. In addition, by placing a period for instance at point 21 on the blackboard 3, the decimals may be taught, as for instance tenths, hundredths, thousandths, as disclosed in Fig. 1 the same being made clear by the use of the words tenths, hundredths, etc., in the adjacent spaces so that the scholar may read the words and see the representation opposite the same. In order to vary the information disclosed at the apertures or openings 5, the traveling belt 12 may be shifted as occasion may require. It will also be evident that under some circumstances, and whenever desired, the information on the belt 12 may be changed and also written or printed in any desired language.

The fraction board 6 is arranged below the belt 12 and has the numerals 7 forming fractions arranged thereon with partitions 22 which hold in place the slides 8. Preferably the partitions 22 are of one color and the slides of another so as to bring out more in contrast the partitions and the numerals or fractions 7. When it is desired to teach a child fractions, any of the slides may be moved as desired, for disclosing what fraction or part of the whole is taken, and what representation indicates such fraction. If it is desired to show the designation for one-half, one of the slides in the second row is shifted, as shown in Fig. 2, for disclosing the fraction one-half. This action may continue for any desired fraction. If it is desired to add one-third to one-third, the designation one-third is disclosed in the third row and one of the slides 8 is moved for disclosing the designation two-thirds, whereupon the child can see the result, each of the slides in the respective rows representing the smallest fraction having that particular denominator number. In the last row it will be observed that the slides are divided into ten parts so that by moving one, one-tenth will be disclosed, and by moving nine, nine-tenths will be disclosed. Addition, subtraction, and multiplication may be taught by adjusting the slides in various manners so that the way fractions are handled will be made clear.

It will be evident that graduated lessons may be provided so that the simpler problems may be presented to the younger scholars, and the more advanced or complicated problems may be presented to the advanced scholars, as for instance, problems in finding the area of a given space. For finding, for instance, the area of a given space a sufficient number of the vertical slides 11 are raised for forming a square above the board 3 and by actually counting the spots disclosed a certain number will be found. By multiplying the number of spots on one side of said square by the number in the bottom row will be given the same number so that the proof of finding the area is manifest.

Having thus described my invention I claim as new and desire to secure by Letters Patent:—

1. In a device of the character described, a suitable supporting frame, a board formed with a plurality of series of apertures, said series of apertures being arranged parallel so as to present pairs of alined apertures, a plurality of slides arranged in back of said board formed with designations adapted to be disclosed through the apertures in one of the series of apertures, manually operated means connected with said slides for actuating the slides, a traveling member with designations arranged thereon designed to be exposed through one of said series of apertures, and an independent covering slide for each of said series of apertures, said covering slides being adapted to be removed when it is desired to expose to view the designations designed to be brought opposite said apertures.

2. In a device of the character described, a board formed with a plurality of series of apertures, a slide for each aperture in one of said series of apertures, each of said slides having designations thereon, manually operated means for each of said slides for actuating the same, means for automatically locking said slides in any of their adjusted positions, and a traveling member formed with designations thereon designed to present said designations opposite the apertures in one of said series of apertures.

3. In a device of the character described, a board formed with a plurality of pairs of apertures therein, a plurality of vertical slides provided with spots arranged on the upper portion and numerals on the lower portion, means for moving said slides so as to cause said spots to be brought to view above said board simultaneously with the bringing to view of the numerals opposite some of said apertures, the numerals brought to view opposite the apertures corresponding to the number of spots disclosed above the board, and means for disclosing the names of the numerals in certain of said apertures.

4. In a device of the character described, a board having an upper and a lower row of observation openings formed therein, a traveling belt arranged opposite said lower row of observation openings, said traveling belt being formed with various information thereon designed to be shifted to various openings in said lower row of observation openings, and a plurality of vertical slides, there being a slide for each of the observation openings in said upper row, each of said slides having formed thereon a plurality of spots or configurations and a numeral for each spot or configuration, the configurations or spots being arranged near one end of said slides and the numerals spaced a considerable distance therefrom whereby said spots or configurations will appear opposite the space above said board simultaneously with the appearance of said numerals opposite the observation openings in said upper row.

5. In a device of the character described, a board formed with an upper and a lower part, said upper part having an aperture therein, a vertical slide formed with numerals, said slide being arranged to slide back and forth across said aperture, whereby said numerals may be disclosed to view, said lower part being formed with transverse slideways, said transverse slideways having fractional numbers arranged on the back thereof, and slides arranged in said slideways, said slides being shorter than the slideways and divided into sections, said sections corresponding to the fractional designations in said slideways, whereby when a numeral is disclosed in the aperture in the upper part of said board the movement of any section of any of said slides will indicate how said number may be divided into fractions and also the relative size of the fraction.

6. In a device of the character described, a board formed with a plurality of transverse slideways, the back of each of said slideways having fractional numerals arranged thereon, said numerals being spaced according to their size, a slide for each of said slideways divided into sections corresponding to the fractions on the back of the slideways, whereby when any of said sections are moved one of the fraction numbers will be disclosed, and thereby indicate by the numeral the size of the fraction and by the size of the division of the slide the size of the fraction.

In testimony whereof I have signed my name to this specification in the presence of two subscribing witnesses.

JOSÉ MIGUEL DE LA ROSA.

Witnesses:
A. L. KITCHIN,
PHILIP D. ROLLHAUS.